(No Model.)
D. N. HURLBUT.
UNDERGROUND ELECTRICAL CONDUIT.
No. 340,046. Patented Apr. 13, 1886.
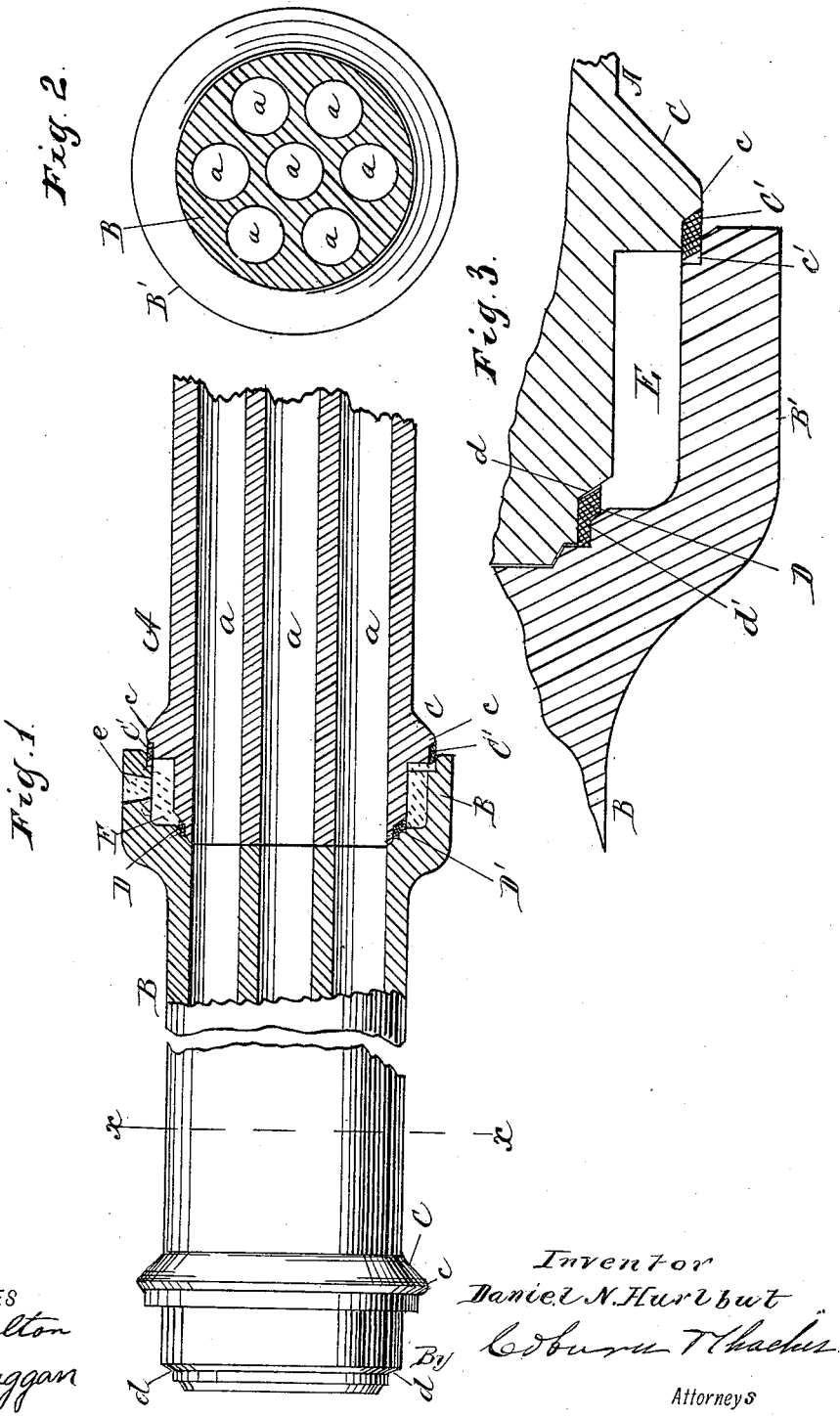
WITNESSES
G. R. Nolton
B. D. Duggan
Inventor
Daniel N. Hurlbut
By Coburn Thacher
Attorneys

United States Patent Office.

DANIEL N. HURLBUT, OF CHICAGO, ILLINOIS.

UNDERGROUND ELECTRICAL CONDUIT.

SPECIFICATION forming part of Letters Patent No. 340,046, dated April 13, 1886.

Application filed November 14, 1885. Serial No. 182,878. (No model.)

*To all whom it may concern:*

Be it known that I, DANIEL N. HURLBUT, a citizen of the United States, and residing at Chicago, in the county of Cook and State of Illinois, have invented a certain new and useful Improvement in Underground Electrical Conduits, which is fully set forth in the following specification, reference being had to the accompanying drawings, in which—

Figure 1 represents an elevation, partly in section, of a conduit having my improvement applied thereto; Fig. 2, a sectional view of the same, taken on the line $xx$ of Fig. 1; and Fig. 3, an enlarged detail sectional view of the joint.

Like letters refer to like parts in all the figures of the drawings.

My invention relates to underground conduits for electric wires, and more particularly to joints for connecting the several sections of which such conduits are composed, its object being to provide a water-tight and gas-proof flexible joint; and to this end my invention consists in certain novel features which I will now proceed to describe, and will then particularly point out in the claims.

In the drawings, A represents one section of an underground electrical conduit, and B the adjoining section. Both sections are provided in the usual manner with a series of longitudinal passages, $a$, to receive the electric wires or cables. One end of the section B is flaring or bell-shaped, as shown at B', in order to receive the adjacent end of the other section, A. The end of the section A which enters the flaring end B' is provided at a short distance from its end with a band or collar, C, upon the edge of which is located a seat, $c$, to receive a packing, C'. This packing may be of any suitable flexible material, it being preferably composed of clay or oakum. At its extremity the pipe A is provided with a seat, $d$, to receive a packing, D', similar to the packing C'. The flaring end B' of the section B is provided with seats $c'$ and $d'$, to receive the packings C' and D', respectively, as shown in detail in Fig. 3 of the drawings.

It will be observed that when the two sections are in position, as shown in Fig. 3, they are not in contact with each other, the packings, however, forming a connection between the two, which will allow of the settling or heaving of the conduits or pipe without cracking the same.

It will be observed that between the packings C' and D' there is an annular space or pocket, E, which, when the two sections are joined together, is closed by means of the packings in an obvious manner. This annular space may, by means of a suitable filling-orifice, $e$, be filled with melted Trinidad asphaltum or other suitable material, tempered so that it will remain flexible or plastic at a low temperature. This filling, in conjunction with the packings C' and D', effectually closes the junction between the two sections of the pipe, making a gas-tight and water-proof joint. This joint, however, instead of being rigid, as is usually the case, is flexible, so as to allow for the heaving and settling of the pipes.

It is obvious that various modifications in the details of construction may be made without departing from the principle of my invention, and I therefore do not wish to be understood as limiting myself strictly to the precise details hereinbefore set forth, and shown in the drawings.

Although I have shown my invention as applied to electrical conduits, it is obvious that its application is not limited to such a construction, it being equally applicable to the joints of sewer-pipe or any other pipe of a kindred nature.

Having thus described my invention, what I claim as new, and desire to secure by Letters Patent, is—

1. In a joint for underground electrical conduits, the combination, with the section having a flaring or bell-shaped end, of the other section constructed to enter said end, the meeting edges of the sections being provided with flexible packings, and an annular space or pocket being formed between the two sections containing a flexible or plastic filling, substantially as and for the purpose specified.

2. The combination, with the section B, having flaring end B' with seats $c'$ and $d'$, of the section A, provided with seats $c$ and $d$, and packings C' and D' to form the closed annular space E, said space being filled with a permanently plastic or flexible filling, whereby a flexible joint between the sections is provided, substantially as and for the purposes specified.

3. The combination of the sections A and B, capable of movement relative to each other, and having at their junction an annular space, E, filled with a flexible filling—such as Trinidad asphaltum—and flexible packings arranged in suitable seats formed at the meeting edges of said pipes, substantially as and for the purposes specified.

DANIEL N. HURLBUT.

Witnesses:
IRVINE MILLER,
ADELLE PHARE.